United States Patent [19]

Hasegawa

[11] Patent Number: 4,626,026

[45] Date of Patent: Dec. 2, 1986

[54] AUTOMOTIVE ROOF STRUCTURE WITH A DETACHABLE SET ROOF

[75] Inventor: Masuo Hasegawa, Isehara, Japan

[73] Assignee: Nissan Shatai Company, Limited, Hiratsuka, Japan

[21] Appl. No.: 590,066

[22] Filed: Mar. 15, 1984

[30] Foreign Application Priority Data

Aug. 23, 1983 [JP] Japan .................................. 58-153963

[51] Int. Cl.⁴ ............................. B60J 7/11; B60J 7/19; B62D 25/07
[52] U.S. Cl. .................................... 296/218; 296/224; 296/208; 296/213; 16/364; 49/463
[58] Field of Search ............... 296/213, 215, 216, 218, 296/224, 154, 208; 49/463–465, 476, 490, 495; 16/357, 360, 374, 376, 362–364

[56] References Cited

U.S. PATENT DOCUMENTS

| | | | |
|---|---|---|---|
| 2,556,062 | 6/1951 | Buehrig | 296/218 |
| 2,714,525 | 8/1955 | Kessler | 296/154 |
| 3,955,848 | 5/1976 | Lutz et al. | 296/216 |
| 4,095,841 | 6/1978 | Thompson | 296/218 |
| 4,121,870 | 10/1978 | Oakey | 296/218 |
| 4,289,349 | 9/1981 | Symeonidis | 296/213 |
| 4,355,843 | 10/1982 | Murakami | 296/213 |
| 4,367,454 | 1/1983 | Modica | 296/218 |
| 4,368,915 | 1/1983 | Torii | 296/213 |
| 4,463,983 | 8/1984 | Hellriegel | 296/213 |
| 4,475,766 | 10/1984 | McKee | 296/213 |

FOREIGN PATENT DOCUMENTS

| | | | |
|---|---|---|---|
| 56-9913 | 1/1981 | Japan . | |
| 56-51628 | 5/1981 | Japan . | |
| 57-42727 | 9/1982 | Japan . | |
| 57-42728 | 9/1982 | Japan . | |
| 178930 | 11/1982 | Japan | 296/218 |
| 927805 | 6/1963 | United Kingdom . | |
| 1194910 | 6/1970 | United Kingdom . | |
| 2054481 | 2/1981 | United Kingdom | 296/213 |

Primary Examiner—Robert B. Reeves
Assistant Examiner—Dennis H. Pedder
Attorney, Agent, or Firm—Schwartz, Jeffery, Schwaab, Mack, Blumenthal & Evans

[57] ABSTRACT

An automotive roof structure includes a detachable set roof detachably mounted on a cut-out or opening formed in a fixed roof of the vehicle body. The set roof is provided with a male guide engageable to a female guide installed on the edge of the cut-out or opening for positioning the set roof within the cut-out or opening. The female guide is adapted to interfere with lateral movement of the male guide when the set roof is in place within the cut-out or opening, and thus prevents the set roof from unexpectedly separating from the cut-out or opening. In addition, the structure includes a double seal structure to ensure a water-tight seal between the set roof and the mating surfaces around the cut-out or opening in order to effectively prevent water, in particular rain water from leaking into the vehicle compartment.

11 Claims, 14 Drawing Figures

AUTOMOTIVE ROOF STRUCTURE WITH A DETACHABLE SET ROOF

BACKGROUND OF THE INVENTION

The present invention relates generally to an automotive roof structure incorporating a detachable roof component which will be hereafter referred to as "set roof". More particularly, the invention relates to a set roof mounting structure for an automotive vehicle roof of the hard-top type.

So-called "T-top" or "T-bar" roof structures for hard-top type automotive vehicles have long been well known and vehicles having T-top or T-bar roofs are available commercially. For example, a T-bar roof structure is employed in the DATSUN 280ZX-T. The set roof mounting structure has been disclosed in Published Japanese Utility Model Application No. 56-9913, published on Jan. 28, 1981, and filed by the assignee of the present invention. In the shown structure, a guide pin is provided in a roof portion of the hard-top body, which roof portion will be referred to hereafter as "fixed roof" throughout this specification, with a cut-out receiving the set roof, which cut-out will be hereafter referred to as "set roof opening" throughout this specification. The guide pin is engageable with a guide member provided in the set roof for positioning the set roof within the set roof opening in the fixed roof.

In addition, Published Japanese Utility Model Applications Nos. 57-42727 and 57-42728, both published on Sept. 20, 1982, and filed by the assignee of the present invention, also disclose somewhat different set roof mounting structures.

U.S. Pat. No. 2,556,062 to G. M. Buchrig, issued on June 5, 1951 also discloses a fundamental structure for a T-bar roof. In the disclosed T-bar-roof construction, a glass set roof with metal roof sash is provided.

The present invention is intended to provide an improved structure for such a T-bar roof body in automotive vehicles. More particularly, an improvement is provided, according to the present invention, for the set roof mounting structure which allows detachable mounting of the set roof to the fixed roof, which structure includes a mechanism for preventing the set roof from being stolen.

SUMMARY OF THE INVENTION

It is an object of the present invention to provide a set roof positioning mechanism for positioning a set roof within a set roof opening, which positioning mechanism also serves to prevent theft of the set roof by removing the latter from the set roof opening before unlocking a lock mechanism.

Another object of the present invention is to provide a T-bar roof which includes a drainage system which effectively drains rain water and so forth from the roof.

A further object of the present invention is to provide a set roof structure which ensures a water-tight seal between a fixed roof and a set roof so as to satisfactorily and successfully prevent rain water and so forth from leaking into the vehicle compartment.

In order to accomplish the above-mentioned and other objects and advantages, an automotive roof structure, according to the present invention, includes a guide means for positioning the set roof within a cut-out or opening formed in a fixed roof formed integrally with the vehicle body. The guide means includes a lateral-movement-restricting means for restricting lateral movement of the set roof in a horizontal plane relative to the cut-out or opening.

In the preferred construction, the lateral-movement-restricting means comprises a first member mounted on the set roof and a second member built into the edge of the cut-out or opening. The first and second members are interengageable such that the second member interferes with horizontal lateral movement of the first member and thus interferes with lateral movement of the set roof relative to the cut-out or the opening.

In another preferred construction, double water-tight seals are established between the mating surfaces of the set roof and the edges of the cut-out or opening in order to ensure prevention of leakage of water into the vehicle compartment.

According to one embodiment of the present invention, an automotive roof structure with a detachable set roof comprises a vehicle body having a roof formed with an opening for receiving the set roof, a guide means for guiding positioning of the set roof relative to the opening when the set roof is to be fitted into the opening, a restricting means, integral with the guide means, for restricting lateral movement of the set roof relative to the opening.

According to another embodiment, an automotive roof structure with a detachable set roof comprising a vehicle body with an integrally formed roof portion defining a pair of set roof receptacles for receiving a pair of the set roofs, a male guide installed on each of the set roofs and extending outwardly from the edges of the set roof, the male guide including a first strip having a downwardly bent edge, and a female guide installed in the edges of each of the set roof receptacles for co-operating with the male guide to position the set roof within the set roof receptacle, the female guide including a second strip having a upwardly bent edge which co-operates with the downwardly bent edge to restrict lateral movement of the set roof relative to the set roof receptacle.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENTS

Figure 1:
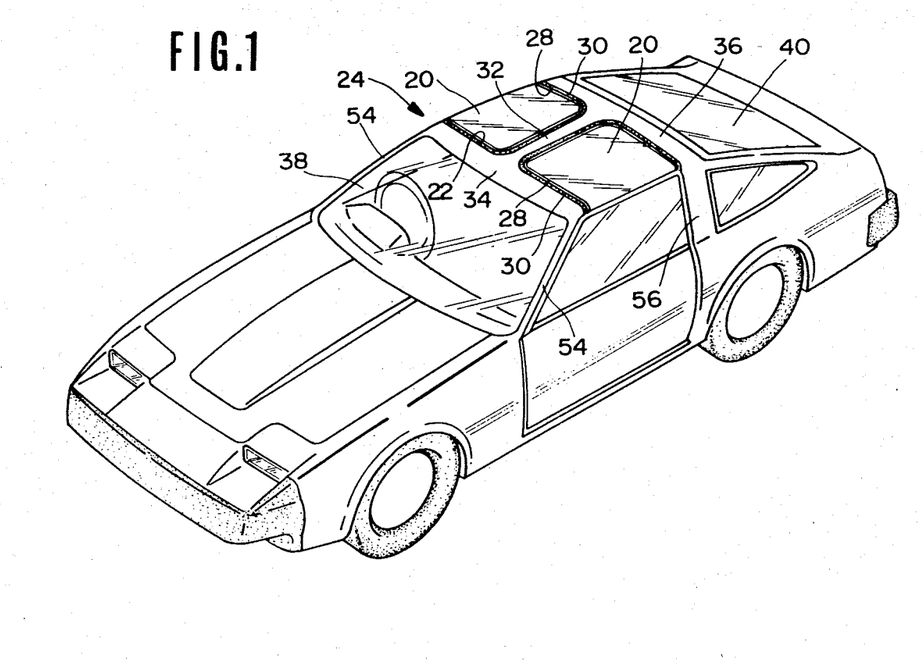
FIG. 1 is a perspective view of an automotive vehicle employing the preferred embodiment of a set roof structure according to the present invention.
Figure 2:
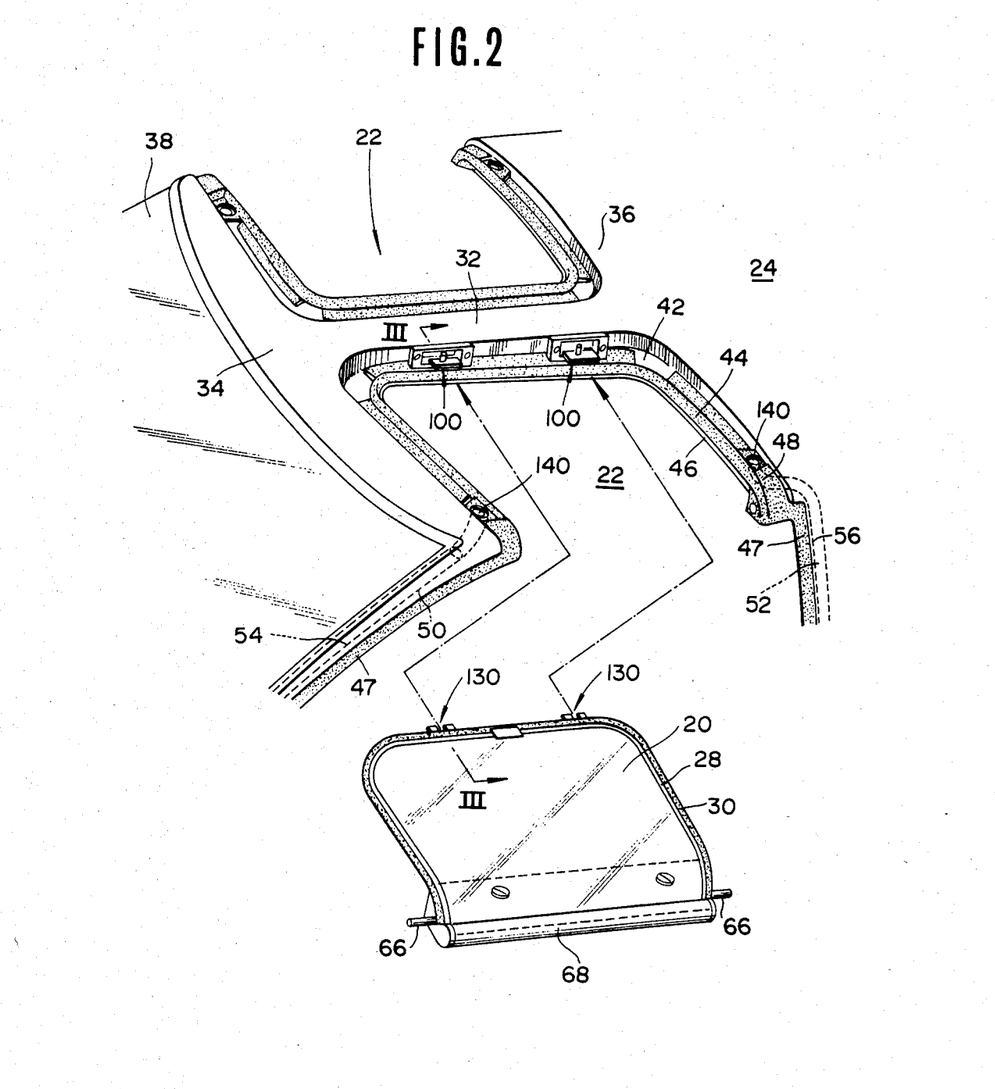
FIG. 2 is an enlarged perspective view of the preferred embodiment of the set roof structure according to the present invention, in which a set roof is released from a set roof opening.

Referring now to the drawings, particularly to FIGS. 1 and 2, the illustrated automotive vehicle has the preferred embodiment of T-bar roof body structure including a pair of set roofs 20 detachably engaged to a pair of set roof openings 22 formed in a fixed roof 24 which is rigidly and integrally formed with the rest of the body. There is one set roof opening 22 for each of the lateral sides of the vehicle roof. Each set roof 20 extends from near the central axis of the roof to the top edge of the corresponding door window 25 and sealingly engages the latter.

The set roof 20 is generally formed of a glass which may be smoked or polarized so as to filter incident sunlight. Each glass set roof 20 is edged with a metal roof sash 28 with an outer weatherstrip 30. The outer weatherstrip 30 is interposed between the roof sash 28 and the circumferential edge of the set roof opening 22 when the set roof is in place. The outer weatherstrip 30 deformably contacts the circumferential edge of the set roof opening 22 to establish a water-tight seal therebetween. In addition, the outer weatherstrip 30 is designed to lie flush with the outer surfaces of the fixed and set roofs 24 and 20 to form a substantially smooth roof surface. Thus, the outer weatherstrip 30 also prevents the type of turbulent air flow which tends to generate a screaming sound.

The set roof openings 22 extend to near the center of the fixed roof. A center roof 32 (i.e., the center portion of the fixed roof 24) is defined by the set roof openings 22. The center roof 32 connects the front portion 34 of the fixed roof to the rear portion 36. The front portion extends laterally along the upper edge of the front window 38 and the rear portion 36 extends laterally along the upper edge of the rear window 40. The center roof 32 serves to increase the strength of the roof, i.e. it serves as a reinforcement for the roof.

Although it is not clearly shown in the drawings, a roof side rail may extend along the lateral side edges of the front and rear portions 34 and 36 and also along the front and rear edges of the set roof opening 22. The roof side rail may further extend through the center roof 32. In this structure, the center roof 32 would be sufficiently reinforced by the roof side rail to ensure sufficient reinforcement for the overall roof structure.

Figure 3:
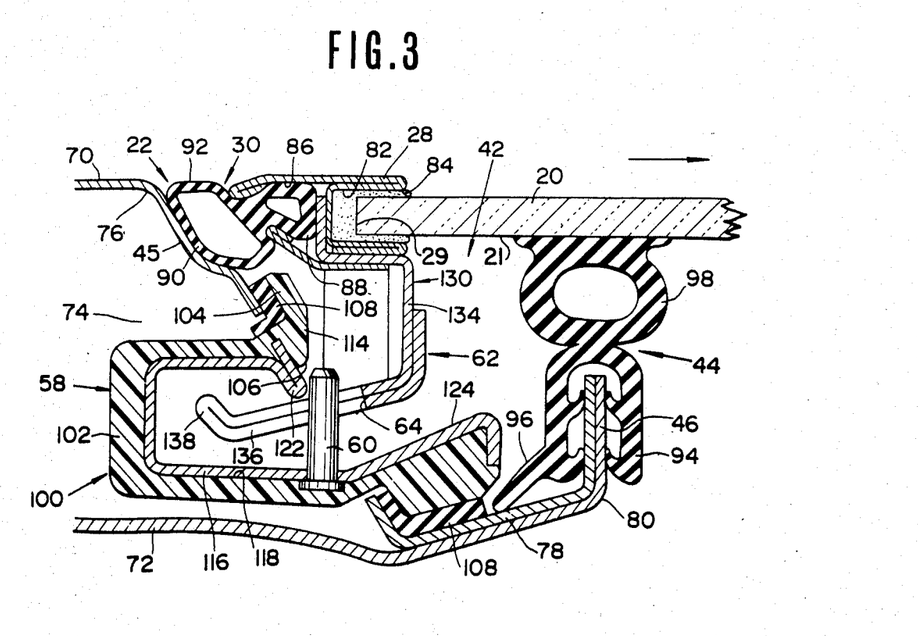
FIG. 3 is a further enlarged cross section of the major part of the set roof structure taken along the line III—III in FIG. 2.
Figure 9:
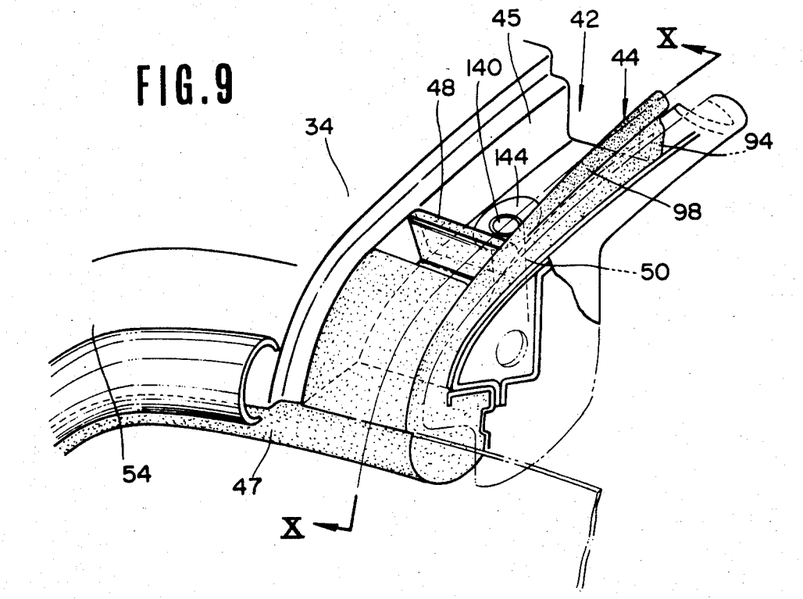
FIG. 9 is an enlarged view of the area encircled in FIG. 2 illustrating a drain system in the set roof structure.
Figure 10:
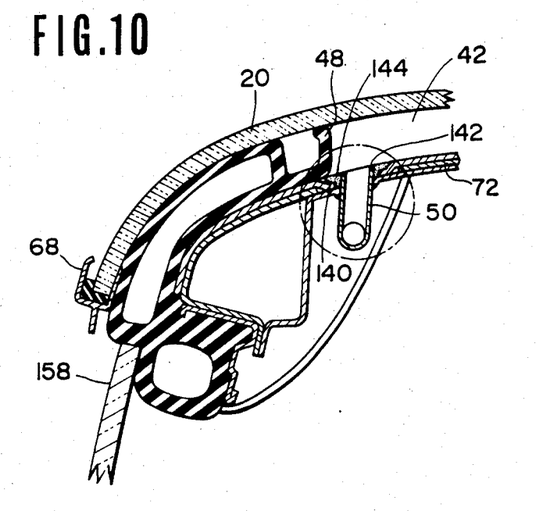
FIG. 10 is a cross section taken along line X—X of FIG. 9.

As shown in FIGS. 2 and 3, a set roof drip channel 42 is formed along the circumferential edge of the set roof opening 22. An inner weatherstrip 44 is fixed to the outer vertical wall portion 46 of the set roof drip channel 42. The inner weatherstrip 44 extends upwardly to contact the lower, i.e. inside, surface 21 of the set roof 20 and establish a second seal therebetween. The inner weatherstrip 44 extends throughout the length of the set roof drip channel and, as shown in FIGS. 9 and 10 has dam walls 48 at both ends thereof. The dam walls extend across the drip channel. Adjacent the dam walls, drain tubes 50 and 52 are connected to the set roof drip channel to receive rain water and so forth flowing through the set roof drip channel. The drain tubes 50 and 52 respectively extend along a front pillar 54 and a rear quarter pillar 56 and drain water from the set roof drip channel to outside of the vehicle.

A pair of fixed guide members 58 are built into a downwardly extending abutment portion 45 of the set roof drip channel. The fixed guide members 58 are provided with guide pins 60 extending vertically from the floors thereof. Set roof guides 62 are provided in the set roof 20 opposite the fixed guide members 58. The set roof guides 62 protrude from the inner transverse edge of the set roof toward the fixed guide members. The set roof guide 62 is formed with a guide groove 64 engageable with the guide pin 60. By means of engagement between the guide groove 64 and the guide pin 60, the set roof guide 62 is engageable to the fixed guide member 58 to retain the set roof 20 within the set roof opening 22.

A pair of locking pins 66 extend from the outer corners of the set roof 20 and essentially parallel to the longitudinal axis of the vehicle. The locking pins are respectively engageable with locking openings (not shown) formed in the vehicle body for securing the set roof onto the set roof opening. The locking pins 66 are respectively associated with a lock/unlock mechanism (not shown). Such set roof lock/unlock mechanism has been recited and illustrated in "Service Circular Information (Service Shuho)" Vol. No. 430(Z-13), published on November, 1980, by Nissan Motor Co., Ltd. The recitation and disclosure of the publication i.e., "Service Circular Information" Vol. 430(Z-13) is hereby incorporated by reference for the purpose of disclosure.

The detailed structure of the guide mechanism for positioning the set roof within the set roof opening will be described with reference to FIGS. 3 to 6.

Generally, the set roof drip channel 42 is defined by the roof side rail outer and inner members 70 and 72. Across most of the roof surface the outer and inner members 70 and 72 lie parallel, defining an enclosed space 74. However, around the edges 76 of the set roof openings 22, the outer member 70 turns downward to join the inner member 72 in a lap joint at 78. The lap-jointed edges 78 of the roof side rail members 70, 72 extend inward toward the opening and turn upwards along an edge 80 and extend about halfway to the level of the outer member 70. Thus, the set roof drip channel 42 is defined by the vertical, extreme edge 46 of lap joint 78, the lap joint 78 itself, and the section 45 of the outer member 70 extending from the edge 76 to the lap joint 78. Although the section 45 is breached as shown in FIG. 3 to receive the guide members 58, it is continuous throughout most of its length.

The roof sash 28 has a generally channel-shaped section 82 bonded to an edge 29 of the set roof 20 by means of a suitable adhesive 84. The sash 28 also has a generally C-shaped outward extension 86. The outward extension 86 is adapted to clamp a hollow cylindrical portion 88 of the outer weatherstrip 30. The outer weatherstrip 30 has another hollow cylindrical portion 90 extending laterally from the cylindrical portion 88 towards the abutment portion 45 of the set roof drip channel 42. The cylindrical portion 90 is adapted to sealingly abut the surface of the abutment portion portion 45 to establish a water-tight first seal. In addition, the upper wall 92 of the cylindrical portion 90 is adapted to lie flush with the roof surface to form a substantially smooth roof surface.

The inner weatherstrip 44 has a welt portion 94 engageable with the outer vertical wall 46. A sealing lip 96 extends from the lower inside end of the welt 94 to the floor 78 of the set roof drip channel 42. The inner weatherstrip 44 also has a cylindrical upward extension 98 adapted to sealingly contact the lower surface of the set roof and so establish a second water-tight seal therebetween.

Figure 4:
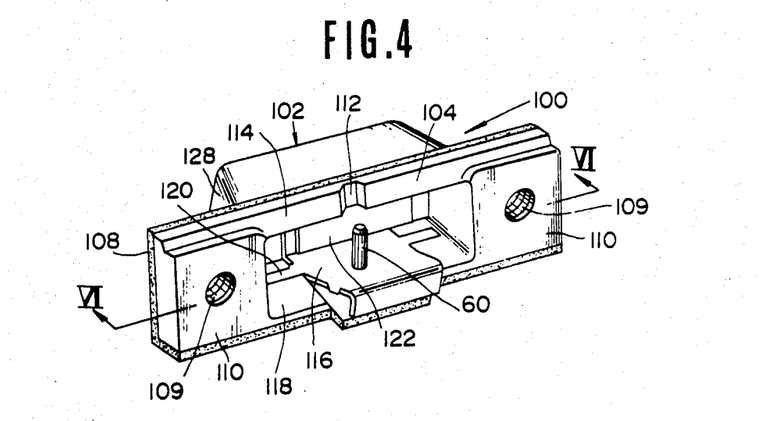
FIG. 4 is a perspective view of a fixed guide member for positioning the set roof within the set roof opening.

As shown in FIGS. 3 and 4, the fixed guide member 58 is generally made of a synthetic resin by way of molding. The molded resin member 100 has an open-box-shaped body 102 and a flange 104 extending from the edges of the open side. The body 102 is received through an opening 106 formed in the abutment portion 45 of the set roof drip channel 42. The flange 104 mates with the upper edge of the opening 106. An elastic seal 108, such as a rubber gasket, seals the joint between the flange 104 and the opening 106. Bolt holes 109 formed in lateral extensions 110 of flange 104 allow the fixed guide member 58 to be bolted to the abutment portion 45 of the outer roof side rail member 70. In addition, a vertically-aligned marker groove 112 is centered in the leg 114 of the flange 104 above the opening 106. The marker groove 112 serves as a positioning mark for the guide pin 60. The guide pin 60 is fixed in the body 102 by means of a metal insert 116 partially lining the inside of the body 102. The guide pin 60 projects upwards from a floor 118 of the body 102. The metal insert 116 has laterally extending strips 120 engaging the floor 118 of the body 102 in order to secure the metal insert to the body 102. In addition, the metal insert or strip 116 has a means for defining a recess such as a peripheral bent edge or lip 122 extending downwards from the ceiling of the body portion 102 behind the guide pin 60. The outer edges of the floors of the resin member 100 and the metal sheet 116 ramp upwards to form a guide ramp 124. The inclination of the guide ramp 124 is essentially equal to that of the lap joint 78 constituting the floor of the roof drip channel 42.

Figure 6:
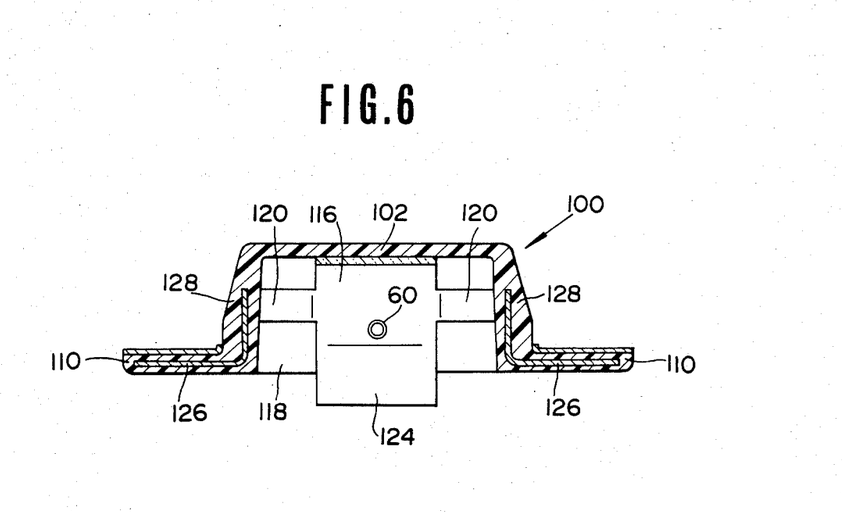
FIG. 6 is a cross section taken along line VI—VI of FIG. 4.

As shown in FIG. 6, metal reinforcing strips 126 are molded together with the resin making up the molded resin member 100. The reinforcing strips 126 are adapted to reinforce the vertical walls 128 of the body portion and the laterally extending flanges 110.

Figure 5:
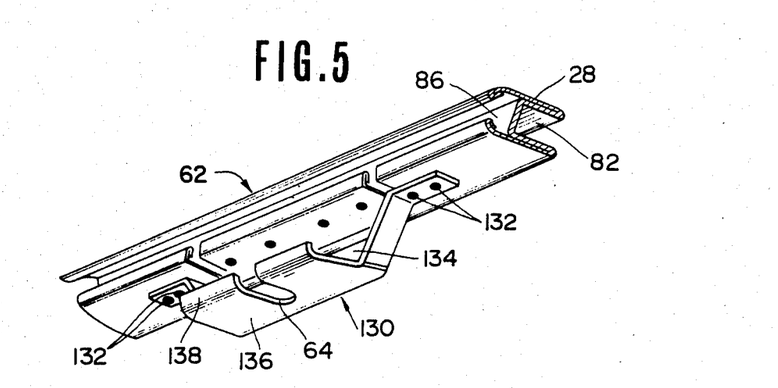
FIG. 5 is a perspective view of a set roof guide installed on the set roof for engagement with the fixed guide member of FIG. 4.
Figure 8:
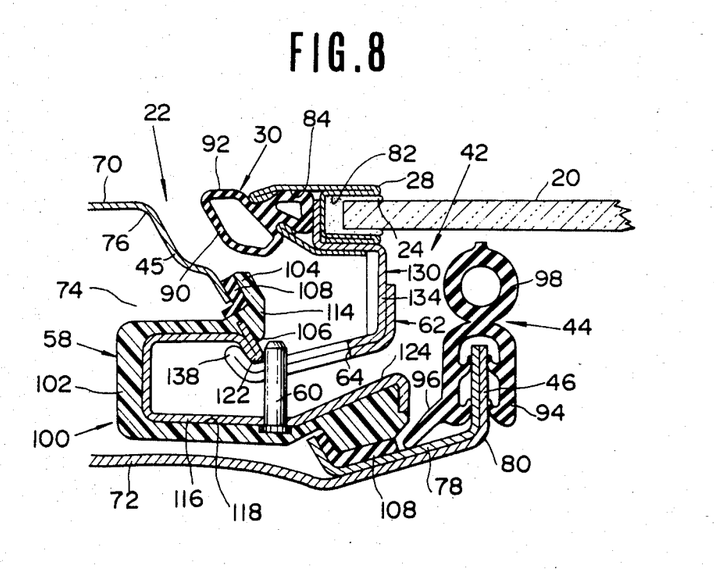
FIG. 8 is a cross section similar to FIG. 3 but showing the state in which the set roof is shifted laterally.

As shown in FIGS. 3 and 5, the set roof guide 62 generally comprises a metal sheet or strip 130 fixed to the roof sash 28 by means of spot welds. The metal sheet 130 has a vertical portion 134 and a horizontal portion 136 extending from the lower edge of the vertical portion. The edge 138 of the horizontal opposite the edge attached to the vertical portion is bent slightly upwards. The upwardly bent edge 138 is adapted to abut the downwardly-extending lip 122 when the set roof is moved directly laterally from its attached position, as shown in FIG. 8.

Figure 7:
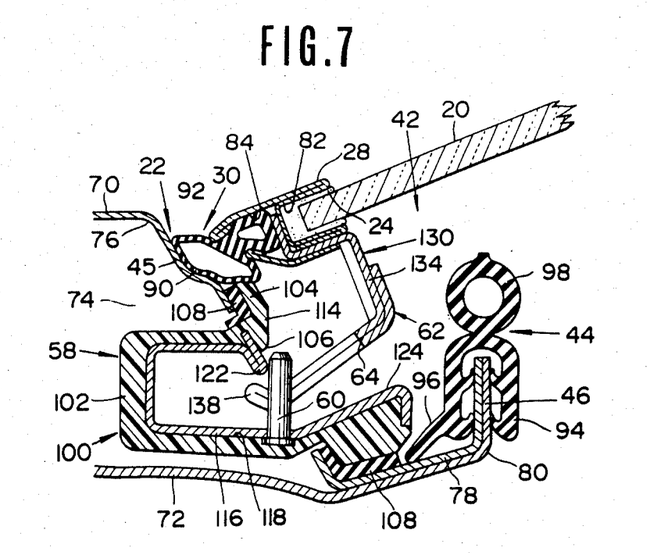
FIG. 7 is a cross section similar to FIG. 3 but showing the state in which the set roof is being set.

To attach the set roof to the set roof opening 22 in the fixed roof, the set roof 20 is first tilted at a certain angle with respect to the horizontal plane. At this position, the guide groove 64 engages the guide pin 60 as shown in FIG. 7. Placement of the set roof 20 is guided by this engagement of the guide grooves 64 of the two set roof guides 62 to the guide pins 60 in the fixed guide members 58.

Thereafter, the set roof 20 can be shifted further toward the center roof 32. After the upwardly bent portion 138 passes the downwardly extending lip 122, the set roof 20 can be returned to the normal horizontal orientation shown in FIG. 8. When the set roof is then shifted laterally as far inward as possible, the lower surface of the set roof 20 comes into contact with the upper edge of the cylindrical extension 98 of the inner weatherstrip 44 and the outer weatherstrip 30 comes into contact with the abutment portion 45 of the set roof drip channel 42, thus establishing a double water-tight seal.

In this position, the foregoing lock/unlock mechanism becomes operative to establish locking engagement between the lock pins 66 and the locking groove formed in the vehicle body. The lock/unlock mechanism is manually operated, to secure the set roof 20 within the set roof opening.

To remove the set roof from the set roof opening, it is necessary to unlock the locking engagement between the lock pins 66 and the locking groove of the vehicle body. so that the set roof can be tilted with respect to the horizontal plane. If the set roof is moved directly in the lateral direction as illustrated in FIG. 8, the upwardly bent edge 138 comes into contact with the downwardly extending lip 122 to prevent further movement of the set roof. This effectively prevents the set roof from being stolen by forcibly moving the set roof in the lateral direction.

Figure 11:
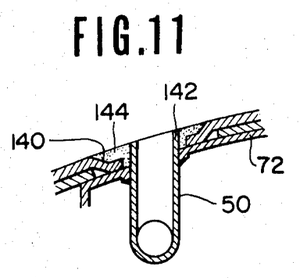
FIG. 11 is an enlarged section showing the portion encircled in FIG. 10.

FIGS. 9 to 11 show the details of the drain system in the preferred embodiment of the T-bar roof structure according to the present invention. As will be seen from FIGS. 9 and 10, the inner weatherstrip 44 has dam walls 48 near both ends thereof, as described previously. Each dam wall 48 is located just downstream of an opening 140 formed in the set roof drip channel 42. The upper end 142 of the drain tube 50 or 52 opens into the floor of the drip channel via the opening 140. As shown more clearly in FIG. 11, a sealer 144 is inserted around the upper end of the drain tube to form a substantially flat surface in the floor of the drip channel. The drain tube is secured to the roof side rail inner member 72 by means of welding.

The inner weatherstrip 44 extends to form vertical weatherstrips 47 extending along the front and rear quarter pillars 54 and 56 through which the drain tubes 50 and 52 descend.

Figure 12:
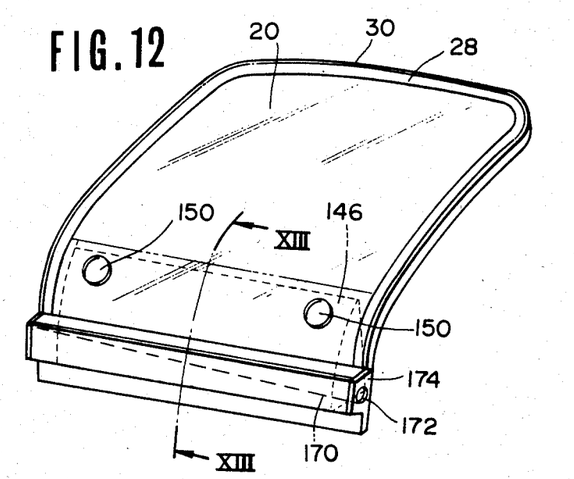
FIG. 12 is a perspective view of the set roof of FIG. 2.
Figure 13:
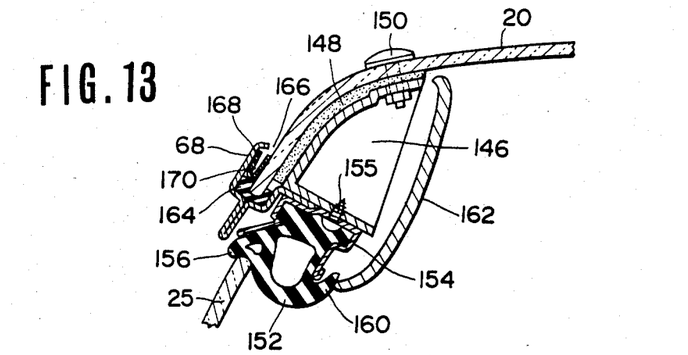
FIG. 13 is a cross section taken along line XIII—XIII of FIG. 12.
Figure 14:
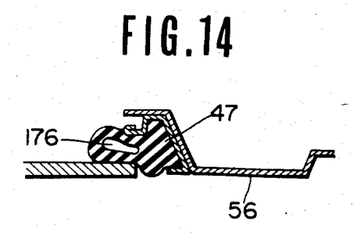
FIG. 14 is an enlarged cross section of a rear quarter pillar weatherstrip as installed on a rear quarter pillar.

As shown in FIGS. 12 and 13, a set roof side frame 146 extends along the outer lateral edge of the set roof 20. The set roof side frame 146 is rigidly secured to the inner surface of the lateral edge of the set roof by means of a layer of adhesive 148 and decorative fastener bolts 150. A weatherstrip 152 is attached to the underside of the set roof side frame 146 by means of a retainer 154 fixed to the frame by means of a fastener screw 155. The weatherstrip 152 has a lip 156 adapted to contact the upper edge of the door window 25 and also a lip portion 160 adapted to contact with a trim 162. The lip portions 156 and 160 are thus adapted to establish a water-tight seal between the upper edge of the door window 158 and the trim 162.

The set roof side frame has a length in the longitudinal direction of the vehicle body which is less than that of the set roof itself, thereby leaving an edge along the sides of the set roof to permit contact of the set roof lower surface with the weatherstrip 44 at all locations.

A drip molding 68 serves to drain water and so forth from the roof surface and is attached to the outer lateral edge of the set roof 20 via a rubber seal 164 and held in place by means of the retainer 154. The drip molding 68 and the outer surface of the set roof 20 define a drip channel 166. A water guide member 168 is inserted into the drip channel. As can be seen from FIG. 13, the water guide member 168 is of essentially V-shaped configuration with a narrow floor 170. As shown in FIG. 12, the bottom 170 is tilted downwards toward its rear end. A water drain opening 172 opens at a position corresponding to the upper end of a water path 176 defined in the weather strip 47. The rain water and so forth flowing through the water drain opening 172 is drained through the water path 176.

Although the drain channel 166 of the shown embodiment is adapted to communicate the water path 176 defined in the rear quarter pillar weatherstrip 47, it would be possible to connect the drip channel 166 to the set roof drip channel 42 through the water drain opening 172.

With the foregoing set roof drip channel construction, a water-tight seal is ensured. Furthermore, even when the set roof is removed soon after a rainstorm, the rain water in the set roof drip channel will not fall into the vehicle compartment due to the weatherstrip extending along the set roof drip channel. In addition, the foregoing construction around the outer edges of the set roof provides a smooth surface within the vehicle compartment.

While the specific embodiment has been disclosed hereabove in order to fully disclose the present invention, the invention can be embodied in many ways without departing from the principles of the appended claims. Therefore, the invention should be understood or interpreted to include all of the possible embodiments and modifications within the scope of the appended claims.

What is claimed is:

1. A T-top for a vehicle, comprising:
    a vehicle roof including a three-sided opening and a central pillar extending in the longitudinal direction of the vehicle body, said opening including an edge along said three sides, one of said edges defined along said center pillar;
    a set roof receivable in said opening along said three sides and having an outer edge unbounded by said three sides; and
    an inner latch mechanism for securement of said set roof in said opening, said inner latch mechanism including:
    (a) a guide pin installed in said center pillar edge;
    (b) a guide strip formed along an edge of said set roof and including a guide groove engageable with said guide pin, said guide strip including an upwardly bent edge; and
    (c) a recess formed in said center pillar edge for receiving said guide strip, said recess including a downwardly extending lip engageable with said upwardly bent edge of said guide strip;
    wherein upward tilting of said set roof from said outer edge disengages said inner latch mechanism, and wherein movement of said set roof is restricted in a direction transverse to said longitudinal direction of said vehicle body, when said set roof is received in said opening, by means of said engagement of said downwardly extending lip and said upwardly bent edge.

2. A T-top as claimed in claim 1, wherein said edges of said opening include a drip channel extending inwardly from said three sides toward said opening, said drip channel having means for attachment of a first weatherstrip, said first weatherstrip being adapted to sealingly contact a lower surface of said set roof along said three sides of said opening to establish a water-tight seal therebetween.

3. A T-top as claimed in claim 2, wherein said edges of said opening include an abutment portion extending downwardly from an outer surface of said vehicle roof, and wherein said set roof includes a second weatherstrip attached along said edge of said set roof, said second weatherstrip abutting said abutment portion when said set roof is received in said opening.

4. A T-top as claimed in claim 2, wherein said means for attachment of said first weatherstrip includes an upwardly extending end of said drip channel, said upwardly extending end being formed from an end extending inward from said three sides toward said opening.

5. A T-top as claimed in claim 1, wherein said set roof includes a frame installed over a portion of said lower surface of said set roof along said outer edge, the length of said frame in said longitudinal direction of said vehicle body being less than that of said set roof, such that said frame permits contact of said first weatherstrip along said lower surface of said set roof at all locations along said edge of said opening.

6. A T-top as claimed in claim 1, wherein said T-top includes a plurality of said inner latch mechanisms.

7. A T-top as claimed in claim 2, wherein said first weatherstrip has a dam portion near its end, said dam portion extending across said drip channel and being associated with a drain path having an opening near said dam portion for draining water from said drip channel.

8. A T-top as claimed in claim 7, wherein said drain path extends along a pillar portion of the vehicle body.

9. A T-top as claimed in claim 2, wherein said first weatherstrip has dam portions near both of its ends, each said dam portion extending across said drip channel and being associated with drain paths opening near each said dam portion for draining water from said drip channel, and each of said drain paths extending along a separate pillar of the vehicle body.

10. A T-top as claimed in claim 7, which further comprises a drip molding installed on the outer edge of said set roof, said drip molding including a flow guide for channelling water.

11. A T-top as claimed in claim 10, wherein said flow guide is tilted and associated with a drain path at the lower end.

* * * * *